June 17, 1969  W. PÖLL  3,450,249

APPARATUS FOR COUNTING AND PRE-SORTING RODS

Filed Jan. 5, 1966

INVENTOR
Willy PÖLL
BY Werner O. Kleeman
His Attorney

United States Patent Office 3,450,249
Patented June 17, 1969

3,450,249
APPARATUS FOR COUNTING AND PRE-SORTING RODS
Willy Pöll, Zurich, Switzerland, assignor to Holding Intercito SA., a corporation of Panama
Filed Jan. 5, 1966, Ser. No. 518,844
Claims priority, application Switzerland, Jan. 12, 1965, 378/65
Int. Cl. B65b 57/20; G06m 3/02
U.S. Cl. 198—40                6 Claims

ABSTRACT OF THE DISCLOSURE

An apparatus for counting and transporting articles such as rods which consists of a first endless conveyor that receives rods at one end and delivers them transversely disposed to its other end where they fall by gravity onto second conveyor means. The second conveyor means is provided with spaced receiving containers that are arranged to successively receive a counted number of the rods. Mechanism is provided to move the second conveyor in a step-by-step manner so that a predetermined number of rods are delivered to a given receiving container after which it is moved along so that a succeeding receiving container can then be moved so as to receive a counted number of rods. The counting means comprises a contactless counter means that incorporates a light source and a photoelectric cell.

---

Figure 1:
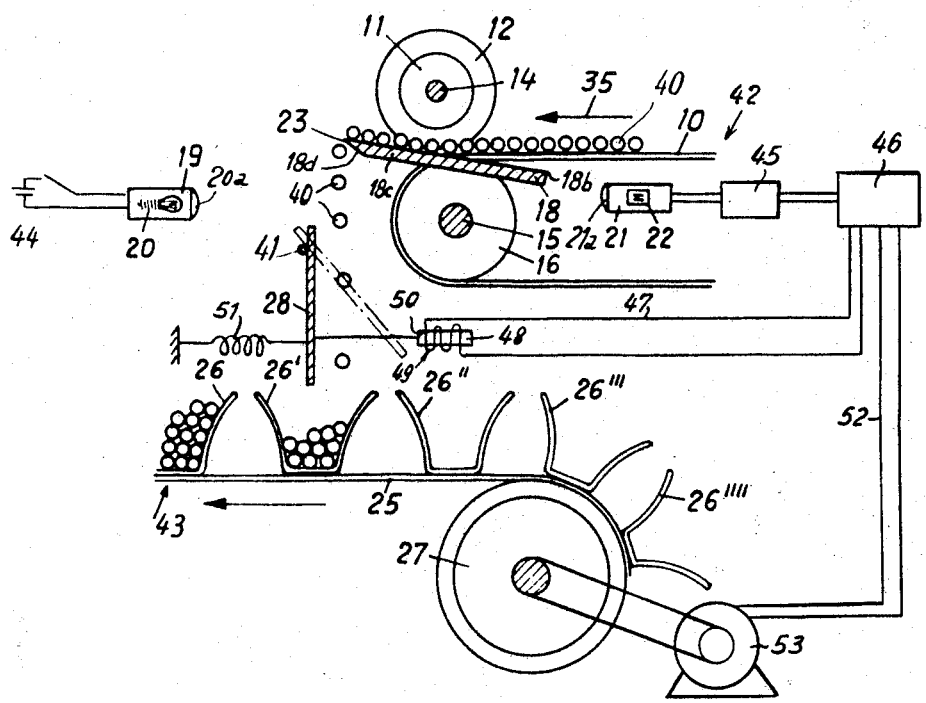

The present invention relates to an improved apparatus for the counting and pre-sorting of rods, especially welding electrodes, wherein such apparatus comprises a first transport mechanism upon which the rods are located transverse to the conveying or feed direction, a second band-shaped transport mechanism provided with receiving containers for a counted quantity of rods, this second transport mechanism being located beneath the first transport mechanism, and further, there is provided a deflecting member between both transport mechanisms which conducts the rods into one of the receiving containers.

Such apparatuses are particularly utilized in conjunction with automatic packaging machines for welding electrodes in the event it is desired to continuously subdivide the produced electrodes into groups, each of which contains a predetermined number of rods.

With previously known apparatuses of this type the welding electrodes which were to be counted were mechanically scanned at the first transport mechanism. However, actual practice has shown that it is extremely difficult to regulate the mechanical scanner or feeler such that each welding electrode is counted with absolute certainty, yet during contact by the mechanical feeler only such slight force is employed that the electrodes which are loosely arranged upon the first transport mechanism are not displaced. The fulfilment of this requirement is rendered even more difficult by virtue of the fact that the apparatus for counting electrodes of different dimensions should be adjustable and typically works in the neighborhood of jarring and impacting groups of machines.

Accordingly, it is primary object of this invention to overcome the disadvantages of the prior art apparatuses mentioned above.

Another, more specific object of this invention is directed to the provision of an improved apparatus for the reliable counting and pre-sorting of rods in a manner guranteeing that the rods will not become damaged during the counting operation.

A further noteworthy object of this invention has reference to an improved apparatus for the high-speed and reliable counting of rod-like members and for sorting them automatically into batches each containing a predetermined number.

Yet a further important object of this invention is directed to an improved construction of apparatus for the counting and sorting of rods into batches, which apparatus is relatively inexpensive to manufacture, highly reliable in operation, carries out the counting operation without physical contact with the rods, requires very little servicing and maintenance, and is not readily subject to breakdown.

Generally speaking, the inventive apparatus is manifested by the features that beneath the first aforementioned transport mechanism there is provided a counter mechanism which counts the rods without contacting them in the free fall path as such rods freely fall from said first transport mechanism, and after a predetermined count such counter mechanism brings about a deflection or displacement of a deflecting member. Since the counter mechanism is of the type which does not physically contact the articles which it counts, it is hereinafter conveniently referred to as "contactless counter mechanism or means." According to a preferred embodiment, the contactless counter mechanism incorporates a light source and a photoelectric cell which controls an eletromagnet for instance which brings about deflection or displacement of the deflecting member.

Due to this arrangement and physical structure of the counter mechanism, it is possible to directly and quickly count the individual welding electrodes in the region of the deflecting member. Since the freely falling electrodes experience a constant acceleration, the welding electrodes which are compactly arranged upon the first transport mechanism during their free fall are separated from one another, this rendering possible the utilization of a contactless counter mechanism. Since the time constant of optical counters which are coupled with electronic amplifiers or automatic control means, is smaller in magnitude than that of mechanical counters, it is possible to considerably increase the counting speed and therefore the efficiency of the apparatus. The utilization of a contactless counter mechanism also enables counting the welding electrodes at that location where, as soon as a certain number has been counted, the deflecting member deviates the subsequent electrodes. Consequently, it is possible to eliminate the previous unpreventable buffer zone between counter and deflecting member, which only then permitted the subdivision of the continuously delivered welding electrodes into counted batches or portions, if the number of electrodes located in the buffer zone was constant, which is always less and less probable with increasing throughpassage speed.

Figure 2:
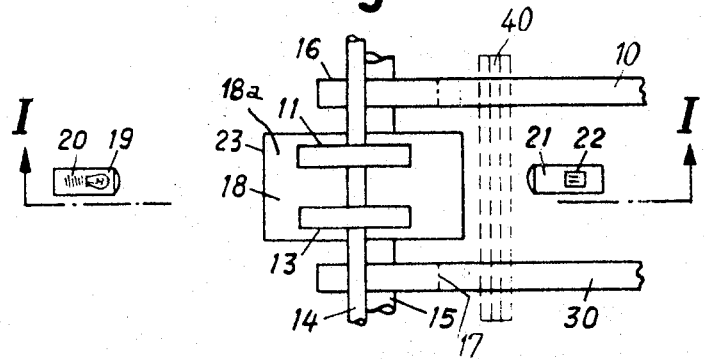

Other features, objects and advantages of the invention will become apparent by reference to the following detailed description and drawing in which:

FIGURE 1 is a schematic, fragmentary, cross-sectional view taken along line I—I of FIGURE 2, and illustrating the counter mechanism, the end region of the first transport mechanism and the beginning of the second transport mechanism provided with receiving containers or the like located beneath said first transport mechanism; and FIGURE 2 schematically illustrates a top plan view of the arrangement of inventive apparatus pictured in FIGURE 1, particularly illustrating the first transport mechanism and the counter mechanism, with the remaining structure depicted in FIGURE 1 here eliminated in order to facilitate illustration of the drawing.

The exemplary embodiment of inventive apparatus depicted in FIGURE 1 comprises a first transport mechanism 42 incorporating, by way of example, two transport band members 10 and 30 which are spaced from one another and at the depicted end of said transport mechanism are guided over the deflecting rollers 16 and 17 respectively. These two band members 10, 30 of the first transport mechanism 42 transport the welding electrodes 40 or otherwise in substantially horizontal direction, specifically from the right towards the left of FIGURES 1 and 2. Both deflecting rollers 16 and 17 are mounted upon a common shaft 15 which is driven by any suitable non-illustrated drive motor. A run-on table or support 18 arranged above the shaft member 15 is located between both of the transport band members 10, 30 which are spaced from one another in the axial direction of the shaft member 15. This run-on table 18 is inclined upwardly with respect to the horizontal and thus also with respect to the transport band members 10, 30. Specifically, run-on table 18 is upwardly inclined with respect to the conveying direction of the welding electrodes 40, indicated by the arrow bearing reference character 35 in FIGURE 1, at an angle amounting to as much as 10°. It will also be observed that this run-on table 18 is provided with an upper support surface 18a receiving the welding electrodes 40 from the upper run of each transport band member 10, 30 of the transport mechanism 42. It also has an inlet end or region 18b which is located beneath such upper run of each transport band member 10, 30, and the underface of this run-on table 18 at the region of its discharge end 18c is provided with a downwardly directed portion 18d forming an acute angle with the upper support surface 18a which is less than 90°, so that said run-on table is defined by a sharp knife-like edge 23 at the aforesaid discharge end 18c.

Moreover, above the run-on table 18 and in substantial parallelism with the shaft member 15 there is arranged a further shaft member 14 to which there are affixed two feed rollers 11 and 13. Each of the latter possesses a covering 12 formed of a soft material having a high coefficient of friction, foam rubber for instance. The spacing of the feed rollers 11, 13 from the run-on table 18 is adjustable, for instance by mounting the support shaft 14 in displaceable non-illustrtated bearing block means in a manner well known to the art, and this spacing is always smaller than the diameter of the welding electrodes 40 which are displaced along and over the aforementioned run-on table 18. Further, the shaft member 14 is operatively connected with the shaft member 15 through the agency of a suitable non-illustrated transmission unit which is constructed such that the peripheral velocity of the feed rollers 11, 13 is practically equal to the velocity of the transport band members 10, 30.

Beneath the run-on table 18, yet above the shaft 15, there is arranged an optical contactless counter means or arrangement incorporating a lamp 20 which is furnished with current by a suitable DC supply, e.g. battery 44. Lamp 20 is located in a housing 19 provided with a suitable lens 20a and delivers a beam of light to a photoelectric cell 22 or equivalent structure which is likewise housed in a housing 21 provided with a lens 21a. The photoelectric cell 22 is electrically coupled with a settable counter unit 45 which is of the type which can be pre-set so that after receiving a given number of impulses from the photoelectric cell 22 and corresponding to the desired electrode count, it delivers a signal to an automatic control device 46 which may be provided, if desired, with a suitable amplifier. This automatic control device 46 then supplies current via the leads 47 to the coil 48 of an electromagnet 49, the armature 50 of which is operatively connected with a deflecting member 28 outside the path of fall of the welding electrodes 40 coming from the first transport mechanism 10, and thereby moves such against the force of a spring 51 from the full line position of FIGURE 1 into the phantom line position, and for reasons which will be explained hereinafter. At the same time, this automatic control device 46 delivers current via the leads 52 to an electric drive motor 53 which drives a second transport mechanism 43 in a stepwise manner for reasons which will also be further explained hereinafter. Considering now the deflecting member 28, it will be recognized that such is located beneath the edge 23 of the run-on table 18 and somewhat forward in the direction of conveying of the electrodes 40 carried by the transport mechanism 42. This deflecting member 28 is hingedly connected to a substantially horizontally arranged shaft 41 and is capable of assuming two working positions, one of which is shown in solid line and the other in phantom line in FIGURE 1. In the solid line position, it depends approximately vertically from the shaft member 41 in downward direction and in the phantom line position it is inclined at an angle of about 45° to the vertical. Deflecting member 28 is normally held in the solid or full line position by the force of the previously considered spring member 51.

The aforementioned second transport mechanism 43 is located beneath this deflecting member 28, and to facilitate illustration of the drawing in FIGURE 1 there is only depicted the turning or deflecting roller 27 driven by the drive motor 53 which is located at the one extreme end of this transport mechanism 43. The latter is preferably a band-like conveyor unit having a transport band 25 upon which there are secured a number of receiving containers 26, 26', 26'', 26''', 26'''', and so forth, each of which is capable of receiving a batch of counted electrodes 40 which freely fall along a given path from the first transport mechanism 42. It will be recalled that it was mentioned that this transport band 25 of the second transport mechanism 43 is displaced in increments or stepwise, wherein each step corresponds to the spacing from the middle of one receiving container to the middle of the next adjacent container. It was also pointed out that the drive motor 53 for displacing the transport mechanism 43 is actuated by the same automatic control device 46 which operates the electromagnet 49 for displacing the deflecting member 28 into the phantom line position, so that each such movement of this deflecting member 28 into the inclined position is coupled with a further stepwise movement of the transport mechanism 43.

During operation of the inventive apparatus, the welding electrodes 40 shown as rings in FIGURE 1 and compactly arranged upon the upper runs of both transport band members 10 and 30 of the first transport mechanism 42 and in transverse direction with respect to the latter, are conveyed in the direction of arrow 35 of FIGURE 1. As soon as the originally horizontally situated transport bands 10 and 30 are downwardly guided due to following the periphery of the deflecting rollers 16 and 17, the welding electrodes 40 are deposited upon the run-on table 18 located between such deflecting rollers 16, 17 as well as between the transport bands 10, 30. In order to prevent a damming-up or, in fact, a sliding upon one another of the electrodes 40 at the transport mechanism 42, there have been provided the feed rollers 11 and 13, the relatively soft covering or coating 12 of which is pressed against the surface of these electrodes 40 and pushes the latter onto the slightly ascending run-on table 18. During transfer from the first transport mechanism 42 onto the run-on table 18, the electrodes 40 are guided at two points, this serving to bring about a terminal alignment parallel to the edge 23 of the run-on table 18. As soon as these welding electrodes 40 have reached this knife-like edge 23 and passed such, they then proceed to fall freely throughout their entire length and in a uniform manner. Thus, these welding electrodes 40 disposed upon the transport mechanism 42 such that their lengthwise axes are substantially horizontally arranged fall downwards in uniform fashion, whereby the electrodes which are compactly located upon the aforementioned transport mechanism 42 and the run-on table 18, during such free fall and under the influence of gravity with increasing fall height, always become spaced more and more from one another. Such is schematically shown by the free falling electrodes 40 of FIGURE 1. During its free fall, each welding electrode 40 interrupts the bundle of light rays directed between the lamp 20 and the photoelectric cell 22, with the result that each such interruption of the beam of light triggers or produces a counting pulse. These counting pulses are delivered from the photoelectric cell 22 to the settable counter unit 45 and there added. Upon reaching a predetermined, previously set number, the counter unit 45 delivers a signal to the automatic control device 46. The latter then delivers current to the coil 48 of the electromagnet 49 whereby the deflecting member 28 is pulled against the force of the spring 51 from the full line position of FIGURE 1 into the depicted phantom line position. At the same time, this control mechanism or device 46 operates the drive motor 53 so that the transport mechanism 43 is stepwise driven whereby the next receiving container, i.e. container 26″, is displaced from the depicted position of FIGURE 1 into the position previously occupied by receiving container 26′. Due to the deflection of the member 28 into the phantom line position, the successive falling welding electrodes 40 are now deviated into the empty receiving container 26″ and the current decay for the electromagnet 49 is such that the return of the deflecting member 28 with the aid of the return spring 51 is in synchronism with the stepwise advancing movement of the transport mechanism 43, so that during such movement of the receiving container 26″ into the new position those electrodes which are still in free fall will be diverted into this receiving container 26″ while it is moving. When the receiving container 26″ has reached the new position, as shown by the position of receiving container 26′ in FIGURE 1, then also the deflecting member 28 is returned into the fall line position of such figure.

In the described exemplary embodiment of inventive apparatus, the alignment of the freely falling welding electrodes 40 is achieved in that the latter are pushed over an edge 23 of the run-on table 18 which is in parallelism with the respective lengthwise axis of each of the welding electrodes located upon such run-on table 18, and the latter of which possesses at such edge 23 a downwardly directed clearance angle due to its provision of the inclined or tapered surface 18d. The same effect can also be achieved without the use of a run-on table, in that for example the transport band members 10, 30 of the first transport mechanism 42 are trained over deflecting rollers possessing very small diameters or are guided over pointed angle guide rails which prevent a rolling or sliding of the electrodes upon the transport band members.

While there is shown and described a present preferred embodiment of the invention, it is to be distinctly understood that the invention is not limited thereto, but may be otherwise variously embodied and practised within the scope of the following claims.

What is claimed is:

1. Apparatus for counting and presorting rods, especially welding electrodes, comprising a first transport mechanism for conveying rods in a predetermined direction of travel, the rods being located upon said first transport mechanism transverse to the conveying direction, a second transport mechanism located in spaced relation and beneath said first transport mechanism, a plurality of receiving containers into which a counted number of rods are deposited carried by said second transport mechanism, said rods freely falling from said first transport mechanism into said receiving containers of said second transport mechanism, a deflecting member located between both of said transport mechanisms for directing the rods into a given one of said receiving containers, contactless counter means situated beneath said first transport mechanism in operable association with the path of fall of said rods in order to count the rods falling freely from said first transport mechanism, and means operably coupling said contactless counter means with said deflecting member in order to displace the latter into a desired position after a predetermined number of rods have been counter, said first transport mechanism comprises transport band means incorporating a pair of spaced transport bands, a run-on table located at the downstream end of said transport band means with respect to said predetermined direction of travel of said rods and between said pair of spaced transport bands.

2. Apparatus according to claim 1, wherein said run-on table is upwardly inclined at an angle with respect to the horizontal which does not exceed 10°.

3. Apparatus according to claim 1, wherein said run-on table has an inlet end which is situated lower than both upper runs of said pair of spaced transport bands of said first transport mechanism.

4. Apparatus according to claim 1, wherein said run-on table has a discharge end over which the rods fall and which is located transverse to the direction of conveying of the rods.

5. Apparatus according to claim 1, wherein said run-on table has an upwardly inclined support surface for receiving rods thereon, said support surface having an inlet end and a discharge end for the rods, said discharge end having a downwardly directed portion which forms an angle which is less than 90° with said upwardly inclined support surface.

6. Apparatus according to claim 1, further including a pair of driven feed rollers arranged above said run-on table and possessing a peripheral velocity which is at least approximately equal to the transport speed of said rods.

References Cited

UNITED STATES PATENTS 2,523,517   9/1950   Potter _____ 198—40 X
3,139,713   7/1964   Merrill _____ 53—78 X EDWARD A. SROKA, *Primary Examiner.*

U.S. Cl. X.R.

53—78; 250—223